United States Patent
Oyama et al.

(10) Patent No.: US 10,573,890 B2
(45) Date of Patent: Feb. 25, 2020

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Masataka Oyama, Tokyo (JP); Ryuuta Yamaya, Tokyo (JP); Takao Kitagawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/936,164

(22) Filed: Mar. 26, 2018

(65) Prior Publication Data

US 2019/0103611 A1    Apr. 4, 2019

(30) Foreign Application Priority Data

Sep. 29, 2017   (JP) .................. 2017-189283

(51) Int. Cl.
| | | |
|---|---|---|
| *H01M 4/58* | (2010.01) | |
| *H01M 4/36* | (2006.01) | |
| *H01M 4/62* | (2006.01) | |
| *H01M 4/04* | (2006.01) | |
| *H01M 4/66* | (2006.01) | |
| *H01M 10/0525* | (2010.01) | |
| *C01B 25/45* | (2006.01) | |
| *H01M 4/02* | (2006.01) | |

(52) U.S. Cl.
CPC .......... *H01M 4/5825* (2013.01); *C01B 25/45* (2013.01); *H01M 4/0404* (2013.01); *H01M 4/366* (2013.01); *H01M 4/623* (2013.01); *H01M 4/625* (2013.01); *H01M 4/661* (2013.01); *H01M 10/0525* (2013.01); *C01P 2004/50* (2013.01); *C01P 2004/61* (2013.01); *C01P 2004/62* (2013.01); *C01P 2004/80* (2013.01); *C01P 2006/40* (2013.01); *H01M 2004/021* (2013.01); *H01M 2004/028* (2013.01); *H01M 2220/20* (2013.01)

(58) Field of Classification Search
CPC .... H01M 4/366; H01M 4/5825; H01M 4/625; H01M 10/0525; C01B 25/45; C01P 2004/51; C01P 2004/50; C01P 2004/80
See application file for complete search history.

(56) References Cited

U.S. PATENT DOCUMENTS

| | | | | |
|---|---|---|---|---|
| 2007/0059598 A1* | 3/2007 | Yang | ...................... | B82Y 30/00 429/209 |
| 2008/0268342 A1* | 10/2008 | Suzuki | ................... | C01B 25/45 429/231.5 |
| 2012/0064408 A1* | 3/2012 | Song | ...................... | H01M 4/366 429/220 |
| 2013/0052535 A1* | 2/2013 | Yanagihara | ........... | H01M 4/485 429/220 |
| 2014/0335413 A1* | 11/2014 | Ooishi | .................. | H01M 4/366 429/220 |
| 2016/0036042 A1* | 2/2016 | Forbert | ................... | C01B 25/45 429/221 |

FOREIGN PATENT DOCUMENTS

| | | | |
|---|---|---|---|
| JP | 11-162470 A | | 6/1999 |
| JP | 2009-004371 A | | 1/2009 |
| JP | 2012-104290 A | | 5/2012 |
| JP | 2015-041556 A | | 3/2015 |
| JP | 2015-088333 A | | 5/2015 |
| KR | 20170004461 A | * | 1/2017 |

OTHER PUBLICATIONS

Machine translation for KR 20170004461 A. (Year: 2019).*
Office Action for Japanese Patent Application No. 2017-189283 (dated Feb. 6, 2018).

* cited by examiner

*Primary Examiner* — Adam A Arciero
(74) *Attorney, Agent, or Firm* — Merchant & Gould P.C.

(57) ABSTRACT

A cathode material for a lithium-ion secondary battery including: granulated bodies in which primary particles are aggregated, wherein an average particle diameter of the granulated bodies is 0.90 μm or more and 2.00 μm or less, particle diameters of 90% or more of the granulated bodies are 0.25 μm or more and 3.50 μm or less, wherein particle diameters of the granulated bodies are evaluated such that 300 granulated bodies are randomly selected from a view of the granulated bodies using a scanning electron microscope, a plurality of diameters of each of the 300 granulated bodies that pass through a central point thereof are evaluated, and a maximum diameter selected from said plurality of diameters is considered as a particle diameter of each of the granulated bodies.

7 Claims, No Drawings

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2017-189283 filed Sep. 29, 2017, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathodes of lithium-ion secondary batteries, cathode material mixtures including a cathode material, a binder, and the like are used. As a cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called an electrode current collector.

Regarding the form of the cathode material, when granular granulated bodies (secondary particles) obtained by agglomerating primary particles are used, it is possible to improve the electrode coating property. In addition, the lithium ion conduction rate through an electrolytic solution can be improved by appropriately adjusting pores in the granulated bodies.

As electrolytic solutions for lithium-ion secondary batteries, non-aqueous solvents are used. Non-aqueous solvents enable the application of cathode active materials that are oxidized and reduced at a high potential or anode active materials that are oxidized and reduced at a low potential. Therefore, lithium-ion secondary batteries having a higher voltage can be realized.

These lithium-ion secondary batteries have a small size and a higher energy and weigh less than secondary batteries in the related art such as lead batteries, nickel cadmium batteries, and nickel metal hydride batteries. Therefore, lithium-ion secondary batteries are used not only as small-sized power supplies used in portable electronic devices such as mobile phones and notebook personal computers but also as large-sized stationary emergency power supplies or power supplies for mobile bodies such as plug-in hybrid vehicles or electric vehicles.

Regarding the use of lithium-ion secondary batteries, in a case in which a lithium-ion secondary battery is used as a power supply for a mobile body or the like, particularly favorable input and output characteristics are required. In order to improve the input and output characteristics, it is necessary to decrease a variety of resistances in the battery. For example, the interface resistance between an electrode current collector and a cathode mixture layer is one important resistance component.

As a method for decreasing the interface resistance, for example, a method in which the contact area between the electrode current collector and the cathode mixture layer is increased by roughening the surface of the electrode current collector (for example, refer to Japanese Laid-open Patent Publication No. H11-162470) or a method in which the electron migration resistance between the electrode current collector and the cathode mixture layer is decreased by coating the surface of the electrode current collector with porous carbon (for example, refer to Japanese Laid-open Patent Publication No. 2015-088333) is known. However, these electrode current collectors tend to increase the manufacturing costs, and thus, in a case in which the electrode current collector is selected from the viewpoint of costs, it is preferable to select an electrode current collector having a flat surface on which no surface treatment has been carried out due to its most inexpensive price.

SUMMARY OF THE INVENTION

In a case in which a lithium ion battery having excellent input and output characteristics is produced using an electrode current collector having a flat surface, generally, a method in which the interface resistance is decreased by increasing the welding pressure on the electrodes and increasing the contact area between the electrode current collector and the cathode mixture layer can be considered. However, in a case in which granulated bodies obtained by agglomerating primary particles are used as the cathode active material, an increase in the welding pressure on the electrodes excessively collapses the granulated bodies, and thus the number of pores in the granulated bodies decreases, and there is a problem in that the lithium ion conduction rate through an electrolytic solution decreases.

The present invention has been made in consideration of the above-described circumstances, and an object of the present invention is to provide a cathode material for a lithium-ion secondary battery which is capable of suppressing the excess collapse of granulated bodies even in a case in which the welding pressure on the electrodes is increased and enables a decrease in the interface resistance and the improvement of the lithium ion conduction rate in the granulated bodies at the same time, a cathode for a lithium-ion secondary battery including the cathode material for a lithium-ion secondary battery, and a lithium-ion secondary battery including the cathode for a lithium-ion secondary battery.

The present inventors and the like carried out intensive studies in order to achieve the above-described object, consequently found that, in a case in which a cathode material for a lithium-ion secondary battery is made of granulated bodies obtained by agglomerating primary particles, when 300 granulated bodies are randomly selected from a view using a scanning electron microscope, and the maximum diameter of a plurality of diameters that pass through the central points of the granulated bodies is considered as the particle diameter, the average particle diameter is set to 0.90 μm or more and 2.00 μm or less, and the particle diameters of 90% or more of the granulated bodies are set to 0.25 μm or more and 3.50 μm or less, it is possible to suppress the excess collapse of the granulated bodies even in a case in which the welding pressure on electrodes is increased, and it is possible to achieve a decrease in the interface resistance and the improvement of the lithium ion conduction rate in the granulated bodies at the same time, and completed the present invention. Therefore, it is possible to provide a cathode material for a lithium-ion secondary battery having excellent input and output characteristics.

A cathode material for a lithium-ion secondary battery of the first aspect of the present invention is made of granulated bodies obtained by agglomerating primary particles, when 300 granulated bodies are randomly selected from a view using a scanning electron microscope, and a maximum diameter of a plurality of diameters that pass through central points of the granulated bodies is considered as a particle diameter, an average particle diameter is 0.90 μm or more and 2.00 μm or less, and particle diameters of 90% or more of the granulated bodies are 0.25 μm or more and 3.50 μm or less.

In other words, the present invention provides a cathode material for a lithium-ion secondary battery comprising:

granulated bodies in which primary particles are aggregated, wherein an average particle diameter of the granulated bodies is 0.90 μm or more and 2.00 μm or less, particle diameters of 90% or more of the granulated bodies are 0.25 μm or more and 3.50 μm or less, wherein particle diameters of the granulated bodies are evaluated such that 300 granulated bodies are randomly selected from a view of the granulated bodies using a scanning electron microscope, a plurality of diameters of each of the 300 granulated bodies that pass through a central point thereof are evaluated, and a maximum diameter selected from said plurality of diameters is considered as a particle diameter of each of the granulated bodies.

It is preferable that the cathode material described above preferably has the following characteristics. The following characteristics may be combined with each other.

The cathode material for a lithium-ion secondary battery may consists of the granulated bodies.

The granulated bodies may consist of the aggregated primary particles.

The primary particles may consist essentially of a compound represented by general formula $Li_xA_yM_zPO_4$.

The primary particles consist essentially of a compound represented by $LiFePO_4$.

A cathode for a lithium-ion secondary battery of the second aspect of the present invention is a cathode for a lithium-ion secondary battery including an electrode current collector and a cathode mixture layer formed on the electrode current collector, in which the cathode mixture layer includes the cathode material for a lithium-ion secondary battery of the present invention.

A lithium-ion secondary battery of the third aspect of the present invention includes the cathode for a lithium-ion secondary battery of the present invention.

Effects of the Invention

According to the cathode material for a lithium-ion secondary battery of the present invention, since the cathode material for a lithium-ion secondary battery is made of granulated bodies obtained by agglomerating primary particles, when 300 granulated bodies are randomly selected from a view using a scanning electron microscope, and the maximum diameter of a plurality of diameters that pass through the central points of the granulated bodies is considered as the particle diameter, the average particle diameter is 0.90 μm or more and 2.00 μm or less, and the particle diameters of 90% or more of the granulated bodies are 0.25 μm or more and 3.50 μm or less, it is possible to provide cathode materials for a lithium-ion secondary battery which are capable of suppressing the excess collapse of the granulated bodies even in a case in which the welding pressure on electrodes is increased, enable a decrease in the interface resistance and the improvement of the lithium ion conduction rate in the granulated bodies at the same time, and have excellent input and output characteristics.

According to the cathode for a lithium-ion secondary battery of the present invention, since the cathode material for a lithium-ion secondary battery of the present invention is included, lithium-ion secondary batteries having excellent input and output characteristics can be obtained.

According to the lithium-ion secondary battery of the present invention, since the cathode for a lithium-ion secondary battery of the present invention is included, lithium-ion secondary batteries having excellent input and output characteristics can be obtained.

DETAILED DESCRIPTION OF THE INVENTION

Preferable embodiments and preferable examples of a cathode material for a lithium-ion secondary battery, a cathode for a lithium-ion secondary battery, and a lithium-ion secondary battery of the present invention will be described below.

Meanwhile, the present embodiments are specific description for better understanding of the gist of the present invention and does not limit the present invention unless particularly otherwise described. Addition, omission, substitution, and other modification of the constitution are allowed within the scope of the present invention.

Cathode Material for Lithium-Ion Secondary Battery

A cathode material for a lithium-ion secondary battery of the present embodiment is made of granulated bodies obtained by agglomerating primary particles, when 300 granulated bodies are randomly selected from a view using a scanning electron microscope, and a maximum diameter of a plurality of diameters that pass through central points of the granulated bodies is considered as a particle diameter, an average particle diameter is 0.90 μm or more and 2.00 μm or less, and particle diameters of 90% or more of the granulated bodies are 0.25 μm or more and 3.50 μm or less.

In addition, in the cathode material for a lithium-ion secondary battery of the present embodiment, the average particle diameter is preferably 1.00 μm or more and 1.50 μm or less, and the particle diameters of 90% or more of the granulated bodies are preferably 0.30 μm or more and 3.00 μm or less.

Since the average particle diameter is 0.90 μm or more, the granulated bodies do not collapse during the pressurization of electrodes due to an excess increase in the compressive strength in the granulated bodies, and it is possible to prevent a decrease in the contact area between an electrode current collector and a cathode mixture layer. As a result, it is possible to decrease the interface resistance between the electrode current collector and the cathode mixture layer, and it is possible to improve the input and output characteristics of lithium-ion secondary batteries. Meanwhile, since the average particle diameter is 2.00 µm or less, the compressive strength in the granulated bodies increases, and the granulated bodies do not excessively collapse even when the welding pressure on the electrodes increases, and thus it is possible to maintain the porosity in the granulated bodies at a high level. As a result, the lithium ion conduction rate through an electrolytic solution in the granulated bodies is increased, and it is possible to improve the input and output characteristics of lithium-ion secondary batteries.

Since the particle diameters of 90% or more of the granulated bodies are 0.25 µm or more and 3.50 µm or less, the lithium ion conduction rate through an electrolytic solution in the granulated bodies is fast, and it is possible to increase the proportion of granulated bodies having a compressive strength that is appropriate enough to decrease the interface resistance between the electrode current collector and the cathode mixture layer. As a result, it is possible to improve the input and output characteristics of lithium-ion secondary batteries.

The particle diameter of the granulated body is measured using an image of the granulated body observed using a scanning electron microscope (SEM). For example, in a case in which the particle diameters of the granulated bodies are measured using a laser diffraction method, it is necessary to disperse a specimen, and thus a shear force is applied to the granulated bodies, the granulated bodies may break depending on the strength of the granulated bodies, and there is a disadvantage that it is not possible to accurately measure the particle diameters of the granulated bodies. In contrast, when the particle diameters are measured using a scanning electron microscope, the granulated bodies do not break, and it is possible to accurately measure the particle diameters of the granulated bodies.

The cathode material for a lithium-ion secondary battery of the present embodiment preferably has a carbonaceous film that coats the surfaces of the primary particles (central particles). When the surfaces of the primary particles are coated with the carbonaceous film, it is possible to increase the electron conduction rate on the surfaces of the primary particles or the electron conduction rate among the primary particles and, furthermore, the electron conduction rate between the electrode current collector and the active material particles, and it is possible to improve the input and output characteristics of lithium-ion secondary batteries.

The amount of carbon included in the cathode material for a lithium-ion secondary battery, that is, the amount of carbon forming the carbonaceous film is preferably 0.1 parts by mass or more and 10 parts by mass or less and more preferably 0.6 parts by mass or more and 3 parts by mass or less with respect to 100 parts by mass of the primary particles.

When the amount of carbon is 0.1 parts by mass or more, the discharge capacity at a high charge-discharge rate of lithium-ion secondary batteries increases, and it is possible to realize sufficient charge and discharge rate performance. Meanwhile, when the amount of carbon is 10 parts by mass or less, it is possible to suppress the battery capacity of lithium-ion secondary batteries per unit mass of the cathode material being decreased more than necessary.

The carbonaceous film is a pyrolytic carbonaceous film derived from a thermally treated organic compound. The thickness of the carbonaceous film is preferably 0.2 nm or more and 10 nm or less and more preferably 0.5 nm or more and 4 nm or less.

When the thickness of the carbonaceous film is 0.2 nm or more and 10 nm or less, it becomes easy to closely pack the cathode material for a lithium-ion secondary battery, and thus the amount of the cathode material for a lithium-ion secondary battery packed per unit volume of a cathode for a lithium-ion secondary battery increases. As a result, it is possible to increase the cathode density, and high-capacity lithium-ion secondary batteries can be obtained.

When the thickness of the carbonaceous film is 0.2 nm or more, it is possible to prevent the excessively thin thickness of the carbonaceous film from disabling the formation of films having a desired resistance value. In addition, it is possible to ensure a conductivity suitable for the cathode material for a lithium-ion secondary battery. Meanwhile, when the thickness of the carbonaceous film is 10 nm or less, it is possible to suppress a decrease in the battery capacity per unit mass of the cathode material for a lithium-ion secondary battery.

The coating ratio of the carbonaceous film to the primary particles is preferably 60% or more and 95% or less and more preferably 80% or more and 95% or less. When the coating ratio of the carbonaceous film is 60% or more, the above-described coating effect of the carbonaceous film can be sufficiently obtained.

The density of the carbonaceous film, which is calculated using the carbon component in the carbonaceous film, is preferably 0.3 g/cm$^3$ or more and 1.5 g/cm$^3$ or less and more preferably 0.4 g/cm$^3$ or more and 1.0 g/cm$^3$ or less.

Here, the reasons for limiting the density of the carbonaceous film, which is calculated using the carbon component in the carbonaceous film, to the above-described range are as described below. When the density of the carbonaceous film, which is calculated using the carbon component in the carbonaceous film, is 0.3 g/cm$^3$ or more, the carbonaceous film exhibits a sufficient electron conductivity. Meanwhile, when the density of the carbonaceous film is 1.5 g/cm$^3$ or less, the amount of fine crystals of graphite made of a lamellar structure in the carbonaceous film is small, and thus no steric hindrance is generated by the fine crystals of the graphite during the diffusion of lithium ions in the carbonaceous film. Therefore, there are no cases in which the lithium ion migration resistance increases. As a result, there are no cases in which the internal resistance of lithium-ion secondary batteries increases, and voltage drop does not occur at a high charge-discharge rate of lithium-ion secondary batteries.

The composition excluding the carbonaceous film on the surfaces of the primary particles (the composition of the primary particle) in the cathode material for a lithium-ion secondary battery of the present embodiment is not particularly limited as long as the primary particles are electrochemically active and function as the cathode material, but is preferably a composition represented by General Formula $Li_xA_yM_zPO_4$ (here, A represents at least one element selected from the group consisting of Fe, Mn, Co, and Ni, M represents at least one element selected from the group consisting of Mg, Ca, Co, Sr, Ba, Ti, Zn, B, Al, Ga, In, Si, Ge, and rare earth elements, $0 \leq x \leq 1.1$, $0.8 \leq y \leq 1.1$, and $0 \leq z \leq 0.2$).

Meanwhile, the rare earth elements refer to 15 elements of La, Ce, Pr, Nd, Pm, Sm, Eu, Gd, Tb, Dy, Ho, Er, Tm, Yb, and Lu which are in the lanthanum series.

Examples of a compound represented by General Formula $Li_xA_yM_zPO_4$ include $LiFePO_4$, $LiMnPO_4$, $LiCoPO_4$, $LiFeMnPO_4$, $LiMnZnPO_4$, and the like. Among these, $LiFePO_4$ is more preferred.

When the composition of the primary particle is the composition represented by General Formula $Li_xA_yM_zPO_4$ (here, A represents at least one element selected from the group consisting of Fe, Mn, Co, and Ni, M represents at least one element selected from the group consisting of Mg, Ca, Co, Sr, Ba, Ti, Zn, B, Al, Ga, In, Si, Ge, and rare earth elements, $0 \leq x \leq 1.1$, $0.8 \leq y \leq 1.1$, and $0 \leq z \leq 0.2$), oxygen is strongly bonded to phosphorus through a covalent bond, and thus oxygen is not easily deintercalated from crystals, and the safety can be enhanced. In addition, when the composition of the primary particle is the composition represented by General Formula $LiFePO_4$, it is possible to decrease the difference between the lattice volume during lithium deintercalation and the lattice volume during lithium intercalation. Therefore, it is possible to increase the lithium ion conduction rate in crystals, and it is possible to improve the input and output characteristics of lithium-ion secondary batteries.

The micropore diameter of the granulated body (secondary particle) forming the cathode material for a lithium-ion secondary battery of the present embodiment is preferably 80 nm or more and 500 nm or less and more preferably 100 nm or more and 300 nm or less.

When the micropore diameter of the granulated body is 80 nm or more, it becomes easy for the electrolytic solution to penetrate into the inside of the granulated body, and the migration of lithium ions becomes easy. Meanwhile, when the micropore diameter of the granulated body is 500 nm or less, the contact frequency between the primary particles is high, and the strength of the granulated body increases, and thus the granulated bodies do not easily collapse during the pressurization of the electrodes, and it is possible to maintain the porosity of the electrodes at a high level.

The micropore diameter of the granulated body can be measured using a mercury porosimeter (a mercury intrusion method, apparatus name: POREMASTER, manufactured by Quantachrome Instruments Japan G.K.).

The cathode material for a lithium-ion secondary battery of the present embodiment is granulated bodies manufactured by granulating cathode active material particles obtained using a manufacturing method described below.

The average primary particle diameter of the cathode active material particles in the cathode material for a lithium-ion secondary battery of the present embodiment is preferably 10 nm or more and 700 nm or less and more preferably 20 nm or more and 500 nm or less.

When the average primary particle diameter of the cathode active material particles is 10 nm or more, it is possible to decrease the amount of moisture adsorbed to the surfaces of the primary particles and decrease the amount of moisture included in batteries. In addition, in a case in which the surfaces of the primary particles are coated with the carbonaceous film, the specific surface area of the cathode material for a lithium-ion secondary battery increases, and thus an increase in the mass of necessary carbon is suppressed, and it is possible to suppress a decrease in the charge and discharge capacity of lithium-ion secondary batteries. Meanwhile, when the average primary particle diameter of the cathode active material particles is 700 nm or less, it is possible to suppress the extension of time for lithium ions or electrons to migrate in the cathode material for a lithium-ion secondary battery. Therefore, it is possible to suppress an increase in the internal resistance of lithium-ion secondary batteries and the consequent deterioration of the input and output characteristics.

The BET specific surface area of the cathode material for a lithium-ion secondary battery is preferably 5 $m^2/g$ or more and 50 $m^2/g$ or less.

When the BET specific surface area is 5 $m^2/g$ or more, the coarsening of the cathode material for a lithium-ion secondary battery is suppressed, and it is possible to increase the diffusion rate of lithium ions in the particles. Therefore, it is possible to improve the battery characteristics of lithium-ion secondary batteries. Meanwhile, when the BET specific surface area is 50 $m^2/g$ or less, it is possible to prevent an excessive increase in the porosity of the electrode in a cathode for a lithium-ion secondary battery including the cathode material for a lithium-ion secondary battery, and thus it is possible to provide lithium-ion secondary batteries having a high energy density.

In the cathode material for a lithium-ion secondary battery of the present embodiment, the electrode porosity of the cathode for a lithium-ion secondary battery which is obtained by adding the cathode material, polyvinylidene fluoride (PVdF), and acetylene black (AB) to N-methyl-2-pyrrolidinone (NMP) so that the mass ratio (the cathode material:AB:PVdF:NMP) in paste reaches 36:2:2:60, mixing the components, and kneading the components in a dispersion mode for 10 minutes and then in a defoaming mode for five minutes using a kneader under a conditions of a revolution rate of 2,000 rpm so as to prepare cathode material paste, then, applying this cathode material paste to the surface of a 30 μm-thick aluminum foil having a flat surface which is not roughened by means of a chemical treatment or the like so as to form a coated film (here, the amount of the cathode material paste is adjusted so that the capacity density of a cathode mixture layer to be obtained reaches 1.5 $mAh/cm^2$ in the case of computation with the capacity of lithium iron phosphate set to 170 mAh/g), drying the coated film at 120° C. for 12 hours in a vacuum atmosphere, forming the cathode mixture layer on the surface of the aluminum foil, and then pressurizing the cathode mixture layer cut to a coating width of 3.5 cm using a roll calendering machine having a load management function at a gap of 45 μm, a linear pressure of 7 t/250 mm, and a feeding rate of 0.5 m/min is preferably 35.0% or more and 39.0% or less and more preferably 36.0% or more and 38.0% or less.

In other words, it is preferable that the cathode material for a lithium-ion secondary battery has 35.0% or more and 39.0% or less of an electrode porosity of a cathode for a lithium-ion secondary battery. The electrode porosity is obtained by: adding the cathode material, polyvinylidene fluoride shown by PVdF, and acetylene black shown by AB to N-methyl-2-pyrrolidinone shown by NMP so that a mass ratio (the cathode material:AB:PVdF:NMP) in paste is 36:2:2:60, mixing the components to form a mixture, kneading the mixture using a kneader in a dispersion mode for 10 minutes at a revolution rate of 2,000 rpm and then in a defoaming mode for five minutes so as to prepare a cathode material paste, applying the cathode material paste to a surface of a 30 μm-thick aluminum foil having a flat surface so as to form a coated film, drying the coated film at 120° C. for 12 hours in a vacuum atmosphere to form a cathode mixture layer on the surface of the aluminum foil, cutting the cathode mixture layer to a coating width of 3.5 cm, pressurizing the cathode mixture layer using a roll press machine having a load management function at a gap of 45 μm, a linear pressure of 7 t/250 mm, and a feeding rate of 0.5 m/min to generate a cathode for a lithium-ion secondary battery, and evaluating an electrode porosity of the cathode for a lithium-ion secondary battery.

Here, the electrode porosity of the cathode for a lithium-ion secondary battery can be obtained by subtracting the ratio of the combined value of the volumes of the cathode material, the conductive auxiliary agent, and the binder as the numerator to the volume of the cathode mixture layer excluding the electrode current collector made of the aluminum foil as the denominator in the cathode after the pressurization from one and multiplying the ratio by 100.

In the cathode material for a lithium-ion secondary battery of the present embodiment, the interface resistance between the current collector and the cathode mixture layer in the cathode for a lithium-ion secondary battery which is obtained by adding the cathode material, polyvinylidene fluoride (PVdF), and acetylene black (AB) to N-methyl-2-pyrrolidinone (NMP) so that the mass ratio (the cathode material:AB:PVdF:NMP) in paste reaches 36:2:2:60, mixing the components, and kneading the components in a dispersion mode for 10 minutes and then in a defoaming mode for five minutes using a kneader under a conditions of a revolution rate of 2,000 rpm so as to prepare cathode material paste, then, applying this cathode material paste to the surface of a 30 µm-thick aluminum foil having a flat surface which is not roughened by means of a chemical treatment or the like so as to form a coated film (here, the amount of the cathode material paste is adjusted so that the capacity density of a cathode mixture layer to be obtained reaches 1.5 mAh/cm$^2$ in the case of computation with the capacity of lithium iron phosphate set to 170 mAh/g), drying the coated film at 120° C. for 12 hours in a vacuum atmosphere, forming the cathode mixture layer on the surface of the aluminum foil, and then pressurizing the cathode mixture layer cut to a coating width of 3.5 cm using a roll calendering machine having a load management function at a gap of 45 µm, a linear pressure of 7 t/250 mm, and a feeding rate of 0.5 m/min is preferably 0.70 Ω·cm$^2$ or less.

In other words, it is preferable that the cathode material for a lithium-ion secondary battery has 0.70 Ω·cm$^2$ or less of an interface resistance between a current collector and a cathode mixture layer included in a cathode for a lithium-ion secondary battery. The interface resistance is obtained by: adding the cathode material, polyvinylidene fluoride shown by PVdF, and acetylene black shown by AB to N-methyl-2-pyrrolidinone shown by NMP so that the mass ratio (the cathode material:AB:PVdF:NMP) in paste is 36:2:2:60, mixing the components to form mixture, kneading the mixture using a kneader in a dispersion mode for 10 minutes at a revolution rate of 2,000 rpm and then in a defoaming mode for five minutes so as to prepare a cathode material paste, applying the cathode material paste to the surface of a 30 µm-thick aluminum foil having a flat surface so as to form a coated film, drying the coated film at 120° C. for 12 hours in a vacuum atmosphere to form a cathode mixture layer on the surface of the aluminum foil, cutting the cathode mixture layer to a coating width of 3.5 cm, pressurizing the cathode mixture layer using a roll press machine having a load management function at a gap of 45 µm, a linear pressure of 7 t/250 mm, and a feeding rate of 0.5 m/min to generate a cathode for a lithium-ion secondary battery which includes a current collector and the cathode mixture layer, and evaluating an interface resistance between the current collector and the cathode mixture layer included in the cathode for a lithium-ion secondary battery.

Here, the interface resistance between the current collector and the cathode mixture layer in the cathode for a lithium-ion secondary battery can be measured using an electrode resistance meter (instrument name: XF057-012, manufactured by Hioki E. E. Corporation) under conditions of an applied current value of 1 mA, a voltage range of 0.2 V, and a measurement speed of normal.

The cathode material for a lithium-ion secondary battery of the present embodiment is made of the granulated bodies obtained by agglomerating the primary particles, when 300 granulated bodies are randomly selected from a view using a scanning electron microscope, and the maximum diameter of a plurality of diameters that pass through the central points of the granulated bodies is considered as the particle diameter, the average particle diameter is 0.90 µm or more and 2.00 µm or less, and the particle diameters of 90% or more of the granulated bodies are 0.25 µm or more and 3.50 µm or less, and thus it is possible to provide cathode materials for a lithium-ion secondary battery which are capable of suppressing the excess collapse of the granulated bodies even in a case in which the welding pressure on the electrodes is increased, enable a decrease in the interface resistance and the improvement of the lithium ion conduction rate in the granulated bodies at the same time, and have excellent input and output characteristics.

Method for Manufacturing Cathode Material for Lithium-Ion Secondary Battery

The cathode material for a lithium-ion secondary battery of the present embodiment can be manufactured by granulating cathode active material particles obtained using a manufacturing method described below.

Method for Manufacturing Cathode Active Material Particles

A method for manufacturing the cathode active material particles in the present embodiment includes, for example, a manufacturing the central particles and a precursor of the central particles, preparing a slurry by mixing at least one central particle raw material selected from the group consisting of the central particles and the precursor of the central particles, an organic compound which is a carbonaceous film precursor, and water, and drying the slurry and calcinating the obtained dried substance in a non-oxidative atmosphere.

Manufacturing Central Particles and Precursor of Central Particles

As a method for manufacturing the compound (the central particles) represented by General Formula $Li_xA_yM_zPO_4$ (here, A represents at least one element selected from the group consisting of Fe, Mn, Co, and Ni, M represents at least one element selected from the group consisting of Mg, Ca, Co, Sr, Ba, Ti, Zn, B, Al, Ga, In, Si, Ge, and rare earth elements, $0 \leq x \leq 1.1$, $0.8 \leq y \leq 1.1$, and $0 \leq z \leq 0.2$), a method of the related art such as a solid phase method, a liquid phase method, or a gas phase method is used. Examples of $Li_xA_yM_zPO_4$ obtained using the above-described method include particulate substances (hereinafter, in some cases, referred to as "$Li_xA_yM_zPO_4$ particles").

The $Li_xA_yM_zPO_4$ particles are obtained by, for example, hydrothermally synthesizing a slurry-form mixture obtained by mixing a Li source, an A source, a P source, water, and, if necessary, an M source. By means of the hydrothermal synthesis, $Li_xFe_yM_zPO_4$ is generated as a precipitate in water. The obtained precipitate may be a precursor of $Li_xA_yM_zPO_4$. In this case, target $Li_xA_yM_zPO_4$ particles are obtained by calcinating the precursor of $Li_xA_yM_zPO_4$.

In this hydrothermal synthesis, a pressure-resistant air-tight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Regarding the A source, as a metal salt containing Fe, for example, at least one selected from the group consisting of iron compounds such as iron (II) chloride ($FeCl_2$), iron (II) sulfate ($FeSO_4$), andiron (II) acetate ($Fe(CH_3COO)_2$) and hydrates thereof; trivalent iron compounds such as iron (III) nitrate ($Fe(NO_3)_3$), iron (III) chloride ($FeCl_3$), and iron (III) citrate ($FeC_6H_5O_7$); and lithium iron phosphate is preferably used.

Regarding the A source, as a metal salt containing Mn, a Mn salt is preferred, and, for example, at least one selected from the group consisting of manganese (II) chloride ($MnCl_2$), manganese (II) sulfate ($MnSO_4$), manganese (II) nitrate ($Mn(NO_3)_2$), manganese (II) acetate (Mn $(CH_3COO)_2$), and hydrates thereof is preferably used.

Regarding the A source, as a metal salt containing Co, a Co salt is preferred, and, for example, at least one selected from the group consisting of cobalt (II) chloride ($CoCl_2$), cobalt (II) sulfate ($CoSO_4$), cobalt (II) nitrate ($Co(NO_3)_2$), cobalt (II) acetate ($Co(CH_3COO)_2$), and hydrates thereof is preferably used.

Regarding the A source, as a metal salt containing Ni, a Ni salt is preferred, and, for example, at least one selected from the group consisting of nickel (II) chloride ($NiCl_2$), nickel (II) sulfate ($NiSO_4$), nickel (II) nitrate ($Ni(NO_3)_2$), nickel (II) acetate ($Ni(CH_3COO)_2$), and hydrates thereof is preferably used.

Examples of the M source include chlorides, carboxylates, sulfates, and the like including at least one element selected from the group consisting of Mg, Ca, Co, Sr, Ba, Ti, Zn, B, Al, Ga, In, Si, Ge, and rare earth elements.

Examples of the P source include phosphoric acid compounds such as phosphoric acid ($H_3PO_4$), ammonium dihydrogen phosphate ($NH_4H_2PO_4$), diammonium hydrogen phosphate (($NH_4)_2HPO_4$), and the like. Among these, as the P source, at least one selected from the group consisting of phosphoric acid, ammonium dihydrogen phosphate, and diammonium hydrogen phosphate is preferably used.

Slurry Preparation Step

By means of the slurry preparation step, the organic compound which is the precursor of the carbonaceous film is interposed among the central particles, and the organic compound and the central particles are uniformly mixed together, and thus the surfaces of the central particles can be uniformly coated with the organic compound.

Furthermore, by means of the calcination step, the organic compound that coats the surfaces of the central particles is carbonized, thereby obtaining cathode active material particles including the central particles that are uniformly coated with the carbonaceous film.

The organic compound that is used in the method for manufacturing the cathode active material particles in the present embodiment is not particularly limited as long as the compound is capable of forming the carbonaceous film on the surfaces of the central particles. Examples of the above-described organic compound include divalent alcohols such as polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, and ethylene glycol, trivalent alcohols such as glycerin, and the like.

In the slurry preparation step, the central particle raw material and the organic compound are dissolved or dispersed in water, thereby preparing a homogeneous slurry.

In the dissolution or dispersion of these raw materials in water, it is also possible to add a dispersant thereto.

A method for dissolving or dispersing the central particle raw material and the organic compound in water is not particularly limited as long as the central particle raw material is dispersed in water and the organic compound is dissolved or dispersed in water. Examples of the above-described method include a method in which a medium stirring-type dispersion device that stirs medium particles at a high rate such as a planetary ball mill, an oscillation ball mill, a bead mill, a paint shaker, or an attritor is used.

When the central particle raw material and the organic compound are dissolved or dispersed in water, it is preferable to disperse the central particle raw material in water in a primary particle form, then, add the organic compound to water, and stir the organic compound so as to be dissolved or dispersed. In such a case, the surfaces of the primary particles of the central particle raw material are easily coated with the organic compound. Therefore, the organic compound is uniformly dispersed on the surfaces of the primary particles of the central particle raw material, and consequently, the surfaces of the primary particles of the central particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during the calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a high-resistance decomposed substance of the organic compound in the obtained agglomerates. Meanwhile, when the calcination temperature is set to 1,000° C. or lower, lithium (Li) in the central particle raw material is not easily evaporated, and the particle growth of the central particles to a size that is equal to or larger than the target size is suppressed. As a result, in a case in which lithium-ion secondary batteries including the cathode for a lithium-ion secondary battery including the cathode material for a lithium-ion secondary battery of the present embodiment are produced, it is possible to prevent the discharge capacity at a high charge-discharge rate from being decreased, and it is possible to realize lithium-ion secondary batteries having sufficient charge and discharge rate performance.

By means of the above-described steps, granulated bodies of the cathode active material particles in which the surfaces of the primary particles of the central particles are coated with carbon (carbonaceous film) generated by the thermal decomposition of the organic compound in the dried substance are obtained.

Classification of Granulated Bodies

Next, the granulated bodies of the cathode active material particles are classified into the fine particle side using a classifier, whereby a cathode material for a lithium ion battery in which the average particle diameter of the granulated bodies is small and the particle size distribution is sharp can be obtained.

Here, a classification method is not particularly limited, but a centrifugal separation-type classifier using an airflow is preferably used. When the centrifugal separation-type classifier using an airflow is used, it is possible to obtain particles on the fine particle side at a high yield.

Cathode for Lithium-Ion Secondary Battery

A cathode for a lithium-ion secondary battery of the present embodiment includes granulated bodies obtained by granulating cathode active material particles having central particles represented by General Formula $Li_xA_yM_zPO_4$ (here, A represents at least one element selected from the group consisting of Fe, Mn, Co, and Ni, M represents at least one element selected from the group consisting of Mg, Ca, Co, Sr, Ba, Ti, Zn, B, Al, Ga, In, Si, Ge, and rare earth elements, $0 \leq x \leq 1.1$, $0.8 \leq y \leq 1.1$, and $0 \leq z \leq 0.2$) and a carbonaceous film that coats the surfaces of the central particles.

The cathode for a lithium-ion secondary battery of the present embodiment includes an electrode current collector made of a metal foil and a cathode mixture layer formed on the electrode current collector, and the cathode mixture layer includes the cathode material for a lithium-ion secondary battery of the present embodiment. The cathode for a lithium-ion secondary battery of the present embodiment is preferably a cathode obtained by forming the cathode mixture layer on one main surface of the electrode current collector using the cathode material for a lithium-ion secondary battery of the present embodiment.

The porosity of the electrode in the cathode for a lithium-ion secondary battery of the present embodiment is preferably 35.0% or more and 39.0% or less.

When the porosity of the electrode is 35.0% or more, it is possible to increase the lithium ion conduction rate through an electrolytic solution, and it is possible to improve the input and output characteristics of lithium-ion secondary batteries. Meanwhile, when the electrode porosity is 39.0% or less, it is possible to increase the contact area between the electrode current collector and the cathode mixture layer, and the interface resistance between the electrode current collector and the cathode mixture layer can be decreased, and thus it is possible to improve the input and output characteristics of lithium-ion secondary batteries.

The interface resistance between the electrode current collector and the cathode mixture layer in the cathode for a lithium-ion secondary battery of the present embodiment is preferably 0.70 $\Omega \cdot cm^2$ or less.

When the interface resistance between the electrode current collector and the cathode mixture layer is 0.70 $\Omega \cdot cm^2$ or less, it is possible to smoothly trade electrons between the electrode current collector and the cathode mixture layer, and thus it is possible to improve the input and output characteristics of lithium-ion secondary batteries.

Since the cathode for a lithium-ion secondary battery of the present embodiment includes the cathode material for a lithium-ion secondary battery of the present embodiment, lithium-ion secondary batteries for which the cathode for a lithium-ion secondary battery of the present embodiment is used have excellent input and output characteristics.

Method for Manufacturing Cathode for Lithium-Ion Secondary Battery

A method for manufacturing the cathode for a lithium-ion secondary battery of the present embodiment is not particularly limited as long as the cathode mixture layer can be formed on one main surface of the electrode current collector using the cathode material for a lithium-ion secondary battery of the present embodiment. Examples of the method for manufacturing the cathode for a lithium-ion secondary battery of the present embodiment include the following method.

First, the cathode material for a lithium-ion secondary battery of the present embodiment, a binder made of a binder resin, and a solvent are mixed together, thereby preparing cathode material paste. At this time, to the cathode material paste in the present embodiment, a conductive auxiliary agent such as carbon black may be added if necessary.

Binder

As the binder, that is, the binder resin, for example, a polytetrafluoroethylene (PTFE) resin, a polyvinylidene fluoride (PVdF) resin, fluorine rubber, or the like is preferably used.

The blending amount of the binder used to prepare the cathode material paste is not particularly limited, but is, for example, preferably 1 part by mass or more and 30 parts by mass or less and more preferably 3 parts by mass or more and 20 parts by mass or less with respect to 100 parts by mass of the cathode material for a lithium-ion secondary battery.

When the blending amount of the binder is 1 part by mass or more, it is possible to sufficiently improve the binding property between the cathode mixture layer and the electrode current collector. Therefore, it is possible to prevent the cathode mixture layer from being cracked or dropped during the formation of the cathode mixture layer by means of rolling or the like. In addition, it is possible to prevent the cathode mixture layer from being peeled off from the electrode current collector in processes of charging and discharging lithium-ion secondary batteries and prevent the battery capacity or the charge-discharge rate from being decreased. Meanwhile, when the blending amount of the binder is 30 parts by mass or less, it is possible to prevent the internal resistance of the cathode material for a lithium-ion secondary battery from being decreased and prevent the battery capacity at a high charge-discharge rate from being decreased.

Conductive Auxiliary Agent

The conductive auxiliary agent is not particularly limited, and, for example, at least one element selected from the group consisting of particulate carbon such as acetylene black (AB), KETJEN BLACK, and furnace black and fibrous carbon such as vapor-grown carbon fiber (VGCF) and carbon nanotube is used.

Solvent

The solvent that is used in the cathode material paste including the cathode material for a lithium-ion secondary battery of the present embodiment is appropriately selected depending on the properties of the binder. When the solvent is appropriately selected, it is possible to facilitate the application of the cathode material paste to substances to be coated such as the electrode current collector.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidinone (NMP), glycols such as ethylene glycol, diethylene glycol, and propylene glycol, and the like. These solvents may be used singly or in a mixture form of two or more solvents.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binder, and the solvent is set to 100% by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binder, the conductive auxiliary agent, and the solvent is not particularly limited as long as these components can be uniformly mixed together. Examples thereof include mixing methods in which a kneader such as a ball mill, a sand mill, a planetary mixer, a paint shaker, or a homogenizer is used.

The cathode material paste is applied to one main surface of the electrode current collector so as to form a coated film, and then this coated film is dried, thereby obtaining an electrode current collector having a coated film made of the mixture of the cathode material and the binder formed on one main surface.

After that, the coated film is pressed by pressure and is dried, thereby obtaining a cathode having the cathode mixture layer on one main surface of the electrode current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present embodiment. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 mol/dm$^3$.

Separator

As the separator, it is possible to use, for example, porous propylene.

In addition, instead of the non-aqueous electrolyte and the separator, a solid electrolyte may be used.

Since the lithium-ion secondary battery of the present embodiment includes the cathode for a lithium-ion secondary battery of the present embodiment as the cathode, the lithium-ion secondary battery has excellent input and output characteristics.

EXAMPLES

Hereinafter, the present invention will be more specifically described using examples and comparative examples, but the present invention is not limited to the following examples.

Example 1

Synthesis of Cathode Material for Lithium-Ion Secondary Battery

Lithium phosphate ($Li_3PO_4$) (2 mol) and iron (II) sulfate ($FeSO_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for eight hours, thereby generating a precipitate.

Next, this precipitate was cleaned with water, thereby obtaining a cake-form cathode active material.

Next, a polyethylene glycol (20 g) as an organic compound and pure water were added to this cathode active material (150 g in terms of solid content), and a dispersion treatment was carried out on a mixture thereof using zirconia balls having a diameter of 1 mm as medium particles in a bead mill for one hour, thereby preparing a homogeneous slurry. At this time, the amount of the pure water was adjusted so that the proportion of the mass of the cathode active material as the numerator in the mass of the slurry as the denominator reached 0.45.

Next, this slurry was sprayed and dried in the atmosphere at 160° C., thereby obtaining granulated bodies of the cathode active material which were coated with an organic substance.

Next, the obtained granulated bodies of the cathode active material were heated up to 700° C. (calcination temperature) at a temperature-rise rate of 300° C./hour in a nitrogen atmosphere, and were then held for two hours. After that, the granulated bodies were naturally cooled, thereby obtaining granulated bodies of the cathode active material which were coated with a carbonaceous film.

Next, the granulated bodies of the cathode active material which were coated with the carbonaceous film were injected into a centrifugal separation-type classifier in which an airflow was used, and the classification point was adjusted by adjusting the flow rate of the airflow so that the average particle diameter of the granulated bodies that were obtained from a collection portion on the fine particle side reached 1.0 μm or more and 1.2 μm or less. A cathode material 1 was obtained from the collection portion on the fine particle side.

Production of Lithium-Ion Secondary Battery

The cathode material 1, polyvinylidene fluoride (PVdF) as a binder, and acetylene black (AB) as a conductive auxiliary agent were mixed into N-methyl-2-pyrrolidinone (NMP) which was a solvent so that the mass ratio (the cathode material 1:AB:PVdF:NMP) in paste reached 36:2:

2:60, and the components were kneaded for 10 minutes in a dispersion mode and then kneaded for five minutes in a defoaming mode using a kneader (trade name: THINKY MIXER, manufactured by Thinky Corporation) under a conditions of a revolution rate of 2,000 rpm, thereby preparing cathode material paste (for the cathode).

This cathode material paste (for the cathode) was applied onto the surface of a 30 μm-thick aluminum foil (electrode current collector) so as to form a coated film, and the coated film was dried at 120° C. for 12 hours in a vacuum atmosphere, thereby forming a cathode mixture layer on the surface of the aluminum foil. The surface of the aluminum foil was not roughened by means of, particularly, a chemical treatment or the like, and the aluminum foil having a flat surface was used. The amount of the cathode material paste was adjusted so that the capacity density of a cathode mixture layer to be obtained reached 1.5 mAh/cm$^2$ in the case of computation with the capacity of lithium iron phosphate set to 170 mAh/g.

After that, the cathode mixture layer cut to a coating width of 3.5 cm was pressurized using a roll calendering machine having a load management function at a gap of 45 μm, a linear pressure of 7 t/250 mm, and a feeding rate of 0.5 m/min, thereby producing a cathode 1 of Example 1.

A lithium metal was disposed as an anode with respect to this cathode 1, and a separator made of porous polypropylene was disposed between the cathode 1 and the anode, thereby producing a member for a battery 1.

Meanwhile, ethylene carbonate and diethyl carbonate were mixed together in a mass ratio of 1:1 (mass ratio), and furthermore, 1 mol/L of a LiPF$_6$ solution was added thereto, thereby preparing an electrolyte solution 1 having lithium ion conductivity.

Next, the member for a battery 1 was immersed in the electrolyte solution 1, thereby producing a lithium-ion secondary battery 1 of Example 1.

Example 2

A cathode material 2 of Example 2 was obtained in the same manner as in Example 1 except for the fact that the average particle diameter of the granulated bodies that were obtained from the collection portion on the fine particle side was set to 1.3 μm or more and 1.5 μm or less.

A lithium-ion secondary battery 2 of Example 2 was produced in the same manner as in Example 1 except for the fact that the cathode material 2 was used.

Example 3

A cathode material 3 of Example 3 was obtained in the same manner as in Example 1 except for the fact that the average particle diameter of the granulated bodies that were obtained from the collection portion on the fine particle side was set to 1.8 μm or more and 2.0 μm or less.

A lithium-ion secondary battery 3 of Example 3 was produced in the same manner as in Example 1 except for the fact that the cathode material 3 was used.

Comparative Example 1

A cathode material 4 of Comparative Example 1 was obtained in the same manner as in Example 1 except for the fact that the average particle diameter of the granulated bodies that were obtained from the collection portion on the fine particle side was set to 0.7 μm or more and 0.9 μm or less.

A lithium-ion secondary battery 4 of Comparative Example 1 was produced in the same manner as in Example 1 except for the fact that the cathode material 4 was used.

Comparative Example 2

A cathode material 5 of Comparative Example 2 was obtained in the same manner as in Example 1 except for the fact that the average particle diameter of the granulated bodies that were obtained from the collection portion on the fine particle side was set to 2.0 μm or more and 2.2 μm or less.

A lithium-ion secondary battery 5 of Comparative Example 2 was produced in the same manner as in Example 1 except for the fact that the cathode material 5 was used.

Comparative Example 3

Synthesis of Cathode Material for Lithium-Ion Secondary Battery

Lithium phosphate (Li$_3$PO$_4$) (2 mol) and iron (II) sulfate (FeSO$_4$) (2 mol) were added to and mixed with water so that the total amount reached 4 L, thereby preparing a homogeneous slurry-form mixture.

Next, this mixture was stored in a pressure-resistant airtight container having a capacity of 8 L and was hydrothermally synthesized at 200° C. for eight hours, thereby generating a precipitate.

Next, this precipitate was cleaned with water, thereby obtaining a cake-form cathode active material.

Next, a polyethylene glycol (20 g) and pure water were added as an organic compound to the cathode active material (150 g in terms of solid content), and a dispersion treatment was carried out on a mixture thereof using zirconia balls having a diameter of 1 mm as medium particles in a bead mill for one hour, thereby preparing a homogeneous slurry. At this time, the amount of the pure water was adjusted so that the proportion of the mass of the cathode active material as the numerator in the mass of the slurry as the denominator reached 0.45.

Next, this slurry was sprayed and dried in the atmosphere at 160° C., thereby obtaining granulated bodies of a cathode active material which were coated with an organic substance.

Next, the obtained granulated bodies of the cathode active material were heated up to 700° C. (calcination temperature) at a temperature-rise rate of 300° C./hour in a nitrogen atmosphere, and then was held for two hours. After that, the granulated bodies were naturally cooled, thereby obtaining a cathode material 6 that was the granulated bodies of the cathode active material which were coated with a carbonaceous film.

A lithium-ion secondary battery 6 of Comparative Example 3 was produced in the same manner as in Example 1 except for the fact that the cathode material 6 was used.

Evaluation of Cathode Material for Lithium-Ion Secondary Battery and Lithium-Ion Secondary Battery The cathode materials for a lithium-ion secondary battery and the lithium-ion secondary batteries of Example 1 to Example 3 and the cathode materials for a lithium-ion secondary battery and the lithium-ion secondary batteries of Comparative Example 1 to Comparative Example 3 were evaluated as described below.

1. Granulated Body Average Particle Diameter

Three hundred granulated bodies were randomly selected from a view using a scanning electron microscope, the maximum diameter of a plurality of diameters that pass through the central points of these granulated bodies was considered as the particle diameter, and the number average of the particle diameters was considered as the granulated body average particle diameter.

2. Proportion of Granulated Bodies Having Particle Diameter of 0.25 µm or More and 3.50 µm or Less Three hundred granulated bodies were randomly selected from a view using a scanning electron microscope, the maximum diameter of a plurality of diameters that pass through the central points of these granulated bodies was considered as the particle diameter, and the proportion of granulated bodies having a particle diameter of 0.25 µm or more and 3.50 µm or less in the 300 granulated bodies was measured.

3. Proportion of Granulated Bodies Having Particle Diameter of 0.30 µm or More and 3.00 µm or Less Three hundred granulated bodies were randomly selected from a view using a scanning electron microscope, the maximum diameter of a plurality of diameters that pass through the central points of these granulated bodies was considered as the particle diameter, and the proportion of granulated bodies having a particle diameter of 0.30 µm or more and 3.00 µm or less in the 300 granulated bodies was measured.

4. Thickness of Coated Film (Cathode Mixture Layer) after Pressurization

The thickness (30 µm) of the aluminum foil which was the electrode current collector was subtracted from the average value of the thicknesses of the roll-calendered cathode measured at five points, thereby obtaining the thickness of the coated film (cathode mixture layer).

5. Electrode Porosity

The porosity of the electrode (cathode mixture layer) in the cathode for a lithium-ion secondary battery was calculated by subtracting the ratio of the combined value of the volumes of the cathode material, the conductive auxiliary agent, and the binder as the numerator to the volume of the cathode mixture layer excluding the aluminum electrode current collector as the denominator in the cathode after the pressurization from one and multiplying the ratio by 100. Meanwhile, the volume of the cathode mixture layer made up of the cathode material, the conductive auxiliary agent, and the binder was calculated as described below. The masses of the respective materials were calculated from the mass of the cathode material and the ratio in mass among the cathode material, the conductive auxiliary agent, and the binder during the preparation of the cathode material paste, and the true density and the mass of each of the materials were multiplied by each other, thereby calculating the volume of each of the materials.

6. Interface Resistance Between Electrode Current Collector and Cathode Mixture Layer The interface resistance between the current collector and the cathode mixture layer in the cathode for a lithium-ion secondary battery was measured using an electrode resistance meter (instrument name:XF057-012, manufactured by Hioki E. E. Corporation) under conditions of an applied current value of 1 mA, a voltage range of 0.2 V, and a measurement speed of normal. Meanwhile, the voltage range was randomly adjusted to a range in which the resistance value was not overloaded.

7. 10 C Discharge Capacity

On the lithium-ion secondary battery, constant current charging was carried out at an ambient temperature of 0° C. and a current value of 0.1 C until the battery voltage reached 3.7 V, then, constant voltage charging was carried out, and the charging was ended when the current value reached 0.01 C. After that, constant current charging was carried out at a current value of 10 C until the battery voltage reached 2.0 V, and the discharge capacity at this time was considered as the 10 C discharge capacity.

In addition, in a case in which the 10 C discharge capacity was 50 mAh/g or more, the input and output characteristics were evaluated as A, in a case in which the 10 C discharge capacity was less than 50 mAh/g and 40 mAh/g or more, the input and output characteristics were evaluated as B, and, in a case in which the 10 C discharge capacity was less than 40 mAh/g, the input and output characteristics were evaluated as C.

Evaluation Results

The evaluation results of the cathode materials for a lithium-ion secondary battery, the cathodes for a lithium-ion secondary battery, and the lithium-ion secondary batteries of Example 1 to Example 3 and Comparative Example 1 to Comparative Example 3 are shown in Table 1.

TABLE 1

| | Granulated body average particle diameter (µm) | Proportion of granulated bodies having particle diameter of 0.25 µm or more and 3.50 µm or less (%) | Proportion of granulated bodies having particle diameter of 0.30 µm or more and 3.00 µm or less (%) | Coated film thickness after pressurization (µm) | Electrode porosity (% by volume) | Interface resistance between current collector and cathode mixture layer (Ω · cm²) | 10 C discharge capacity (mAh/g) | Input and output characteristics |
|---|---|---|---|---|---|---|---|---|
| Example 1 | 1.19 | 97.4 | 94.1 | 48.8 | 37.4 | 0.67 | 60 | A |
| Example 2 | 1.44 | 94.3 | 90.5 | 47.8 | 36.1 | 0.58 | 57 | A |
| Example 3 | 1.86 | 90.1 | 85.2 | 47.1 | 35.2 | 0.44 | 43 | B |
| Comparative Example 1 | 0.84 | 89.5 | 83.1 | 50.2 | 39.2 | 1.55 | 39 | C |
| Comparative Example 2 | 2.04 | 88.7 | 72.1 | 46.7 | 34.7 | 0.28 | 32 | C |
| Comparative Example 3 | 3.77 | 41.9 | 27.2 | 45.8 | 33.4 | 0.25 | 8 | C |

When Example 1 to Example 3 and Comparative Example 1 to Comparative Example 3 are compared with each other from the results in Table 1, in Comparative Example 1 to Comparative Example 3 in which the proportion of granulated bodies having a particle diameter of 0.25 µm or more and 3.50 µm or less was less than 90%, the 10 C discharge capacities were less than 40 mAh/g, and the input and output characteristics were poor. In contrast, it was found that, in Example 1 to Example 3 in which the proportion of granulated bodies having a particle diameter of 0.25 μm or more and 3.50 μm or less was 90% or more, the 10 C discharge capacities were 40 mAh/g or more, and the input and output characteristics were excellent. This is considered to be because, when the electrode porosity is 35% or more, the lithium ion conduction rate through the electrolytic solution is fast, and furthermore, the interface resistance between the electrode current collector and the cathode mixture layer is 0.30 Ω·cm² or less, the electron trade rate between the electrode current collector and the cathode mixture layer is fast. In addition, it was found that, in Example 1 and Example 2 in which the proportion of granulated bodies having a particle diameter of 0.30 μm or more and 3.00 μm or less was 90% or more, the 10 C discharge capacities were 50 mAh/g or more, and particularly, the input and output characteristics were excellent. Meanwhile, it is considered that, in Comparative Example 1, the electrode porosity was as high as 39.2%, and the lithium ion conduction rate through the electrolytic solution was fast, but the interface resistance between the electrode current collector and the cathode mixture layer was as high as 1.55 Ω·cm², and the electron trade rate between the electrode current collector and the cathode mixture layer was slow, and thus the 10 C discharge capacities were less than 40 mAh/g, and the input and output characteristics became poor.

Lithium-ion secondary batteries for which the cathode material for a lithium-ion secondary battery of the present invention is used have excellent input and output characteristics and are thus capable of significantly contributing to the advancement of the reliability of lithium-ion secondary batteries including mobile body uses.

What is claimed is:

1. A cathode material for a lithium-ion secondary battery comprising:
    granulated bodies in which primary particles are aggregated,
        wherein the primary particles are represented by general formula $Li_xA_yM_zPO_4$ (here, A represents at least one element selected from the group consisting of Fe, Mn, Co, and Ni, M represents at least one element selected from the group consisting of Mg, Ca, Co, Sr, Ba, Ti, Zn, B, Al, Ga, In, Si, Ge, and rare earth elements, $0<x£1.1$, $0.8£y£1.1$, and $0£z£0.2$), surfaces of the primary particles are coated by a carbonaceous film,
    the coating ratio of the carbonaceous film to the surface area of the primary particles is 60% or more and 95% or less,
    the thickness of the carbonaceous film is 0.2 nm or more and 10 nm or less,
    wherein an average particle diameter of the granulated bodies is 0.90 μm or more and 2.00 μm or less,
    the particle diameters of 90% or more of the granulated bodies are 0.30 μm or more and 3.00 μm or less,
    wherein particle diameters of the granulated bodies are evaluated such that
    300 granulated bodies are randomly selected from a view of the granulated bodies using a scanning electron microscope,
    a plurality of diameters of each of the 300 granulated bodies that pass through a central point thereof are evaluated, and
    a maximum diameter selected from said plurality of diameters is considered as a particle diameter of each of the granulated bodies.

2. The cathode material for a lithium-ion secondary battery according to claim 1,
    wherein the average particle diameter is 1.00 μm or more and 1.50 μm or less.

3. The cathode material for a lithium-ion secondary battery according to claim 1,
    wherein the primary particles are LiFePO4.

4. The cathode material for a lithium-ion secondary battery according to claim 1,
    wherein the cathode material has 35.0% or more and 39.0% or less of an electrode porosity of a cathode for a lithium-ion secondary battery, wherein the electrode porosity is obtained by:
    adding the cathode material, polyvinylidene fluoride shown by PVdF, and acetylene black shown by AB to N-methyl-2-pyrrolidinone shown by NMP so that a mass ratio (the cathode material:AB:PVdF:NMP) in paste is 36:2:2:60,
    mixing the components to form a mixture,
    kneading the mixture using a kneader in a dispersion mode for 10 minutes at a revolution rate of 2,000 rpm and then in a defoaming mode for five minutes so as to prepare a cathode material paste,
    applying the cathode material paste to a surface of a 30 μm-thick aluminum foil having a flat surface so as to form a coated film,
    drying the coated film at 120° C. for 12 hours in a vacuum atmosphere to form a cathode mixture layer on the surface of the aluminum foil,
    cutting the cathode mixture layer to a coating width of 3.5 cm,
    pressurizing the cathode mixture layer using a roll press machine having a load management function at a gap of 45 μm, a linear pressure of 7 t/250 mm, and a feeding rate of 0.5 m/min to generate a cathode for a lithium-ion secondary battery, and
    evaluating an electrode porosity of the cathode for a lithium-ion secondary battery.

5. The cathode material for a lithium-ion secondary battery according to claim 1,
    wherein the cathode material has 0.70 Ω·cm2 or less of an interface resistance between a current collector and a cathode mixture layer included in a cathode for a lithium-ion secondary battery, wherein the interface resistance is obtained by:
    adding the cathode material, polyvinylidene fluoride shown by PVdF, and acetylene black shown by AB to N-methyl-2-pyrrolidinone shown by NMP so that the mass ratio (the cathode material:AB:PVdF:NMP) in paste is 36:2:2:60,
    mixing the components to form mixture,
    kneading the mixture using a kneader in a dispersion mode for 10 minutes at a revolution rate of 2,000 rpm and then in a defoaming mode for five minutes so as to prepare a cathode material paste,
    applying the cathode material paste to the surface of a 30 μm-thick aluminum foil having a flat surface so as to form a coated film,
    drying the coated film at 120° C. for 12 hours in a vacuum atmosphere to form a cathode mixture layer on the surface of the aluminum foil,
    cutting the cathode mixture layer to a coating width of 3.5 cm,
    pressurizing the cathode mixture layer using a roll press machine having a load management function at a gap of 45 μm, a linear pressure of 7 t/250 mm, and a feeding rate of 0.5 m/min to generate a cathode for a lithium-ion secondary battery which includes a current collector and the cathode mixture layer, and evaluating an interface resistance between the current collector and the cathode mixture layer included in the cathode for a lithium-ion secondary battery.

6. A cathode for a lithium-ion secondary battery, comprising:
an electrode current collector; and
a cathode mixture layer formed on the electrode current collector, wherein the cathode mixture layer includes the cathode material for a lithium-ion secondary battery according to claim 1.

7. A lithium-ion secondary battery comprising:
the cathode for a lithium-ion secondary battery according to claim 6.

\* \* \* \* \*